US006782484B2

(12) United States Patent
McGowan et al.

(10) Patent No.: US 6,782,484 B2
(45) Date of Patent: Aug. 24, 2004

(54) METHOD AND APPARATUS FOR LOSSLESS RESUME CAPABILITY WITH PERIPHERAL DEVICES

(75) Inventors: Steve B. McGowan, Portland, OR (US); John I. Garney, Portland, OR (US)

(73) Assignee: Intel Corporation, Santa Clara, CA (US)

( * ) Notice: Subject to any disclaimer, the term of this patent is extended or adjusted under 35 U.S.C. 154(b) by 554 days.

(21) Appl. No.: 09/745,321

(22) Filed: Dec. 22, 2000

(65) Prior Publication Data

US 2002/0083357 A1 Jun. 27, 2002

(51) Int. Cl.[7] .............................. G06F 1/32; G06F 3/00
(52) U.S. Cl. ...................... 713/323; 713/300; 713/320; 713/324; 710/52; 710/54; 710/57
(58) Field of Search ................................. 713/300, 310, 713/320, 322, 323, 324; 710/52, 54, 57

(56) References Cited

U.S. PATENT DOCUMENTS

| | | | | |
|---|---|---|---|---|
| 3,952,289 A | * | 4/1976 | Baligant ....................... | 710/52 |
| 5,343,435 A | * | 8/1994 | Bourekas et al. ........... | 365/221 |
| 5,355,503 A | * | 10/1994 | Soffel et al. ................. | 713/322 |
| 6,438,699 B1 | * | 8/2002 | Cato et al. ................... | 713/323 |
| 6,513,105 B1 | * | 1/2003 | Pontius ....................... | 711/209 |

FOREIGN PATENT DOCUMENTS

JP          61013324 A     *  1/1986  ............. G06F/3/02

OTHER PUBLICATIONS

Yun, K.Y.; Dill, D.L.; "A high–performance asynchronous SCSI contoller", Computer Design: VLSI in Computers and Processors, 1995. ICCD '95. Proceedings., 1995 IEEE International Conference on, Oct. 2–4, 1995, pp.: 44–49.*

* cited by examiner

*Primary Examiner*—Thomas Lee
*Assistant Examiner*—James K. Trujillo
(74) *Attorney, Agent, or Firm*—Kenyon & Kenyon

(57) ABSTRACT

A system and method are disclosed for power management that reduces computer power consumption by causing a low power state ('suspend' mode) to be entered by specific, peripheral device-related computer components, wherein the components enter the suspend mode after a short period of peripheral device inactivity and are able to resume to an 'active' mode quickly without losing information entered into the peripheral device during the transition from the suspend mode to the active mode. To prevent loss of information during the transition, a peripheral memory device is utilized to store the information inputted during the transition and to deliver the information upon reaching the active mode.

28 Claims, 3 Drawing Sheets

DEVICE FLOW CHART

DEVICE FLOW CHART

METHOD AND APPARATUS FOR LOSSLESS RESUME CAPABILITY WITH PERIPHERAL DEVICES

BACKGROUND INFORMATION

The present invention pertains to a lossless resume capability for peripheral devices. More particularly, the present invention pertains to the storage of data during transitions between suspend and active modes.

With the increasing use of portable computers, a focus has been placed on improving the ability to operate without wired power connections. Therefore, power consumption has become an important concern. Minimizing the amount of energy used by the computer can extend the length of a charge on a computer's battery. The longer the battery can last between charges, the longer the operator can remain 'wireless.'

Alternatively, power usage has become a factor in size reduction of portable computers. The less power a computer needs to operate, the smaller the computer's battery can be. Also, the less power a computer uses, the less heat created in its operation, and hence, the closer the computer components can be placed to one another, enabling further size reduction of the computer.

Several methods are utilized in the art for minimizing power consumption. One method involves bringing the entire computer system into a state of low power usage (a system 'suspend' mode). The system suspend mode can be set to begin after some pre-determined period of computer inactivity. For example, if the computer receives no operator input for a given period of time, the computer ceases all operations except for those that are necessary for maintaining computer state information, etc. Upon sensing an operator's input while the computer is in the suspend mode, the computer resumes full operation (returns to a system 'active' mode).

Several problems exist with this form of power management. For example, the system suspend feature can be very disruptive to an operator's productivity. If the operator is doing work that requires sporadic interactions with the computer system, the operator may often have to wait for the computer to return to the system active mode from the system suspend mode. This transition period can take anywhere from four seconds to a couple of minutes, during which the operator is unable to see his/her work on the screen or interact with the computer. None of the keystrokes or other computer inputs the operator provides will be received or recognized by the computer system during this transition period. They will be lost. The operator is forced to perform a computer input, such as a keystroke, to begin the transition period and wait until the computer system reaches the system active mode before he/she can start to interact with the computer system again.

In the alternative, during normal use by an operator, the computer may never utilize the system suspend feature, thus not reducing power consumption. If the operator consistently interacts with the computer system, the period of inactivity required for the suspend feature may never be reached, preventing power savings or benefit of any kind from this form of power management.

Therefore, there exists a need for an improved method and apparatus for power management that reduces computer power consumption.

DETAILED DESCRIPTION

To overcome the aforementioned problems, a system and method are disclosed for power management that reduce power consumption by causing a peripheral suspend mode to be entered by peripheral device-related computer components. In one embodiment, the components enter a peripheral suspend mode after a short period of inactivity (3–5 seconds) and are able to resume to an active mode quickly (20–100 ms) upon receipt of peripheral input. Loss of data entered during the transition period is prevented by providing a peripheral memory device that stores inputted information (keystrokes, etc.) in a queue and forwarding the data to the host computer when the system has reached the active mode and communication between the peripheral device and the host computer are re-established. With the ability to return to the active mode from the suspend mode very quickly (in about 50 milliseconds) and the capacity to store keystrokes entered during that short transition period, the present invention provides for an improved method and system for power management.

Average patterns of measured activity while editing or browsing, are 4 seconds of active input followed by 60 seconds of inactivity. In an embodiment, during this period of inactivity, the keyboard and mouse can be 'suspended' by the system (or internally by the device) to a low power state. However, a user editing a document should never notice the difference, other than a slight delay in the display of a character after a couple seconds of inactivity.

Figure 1:
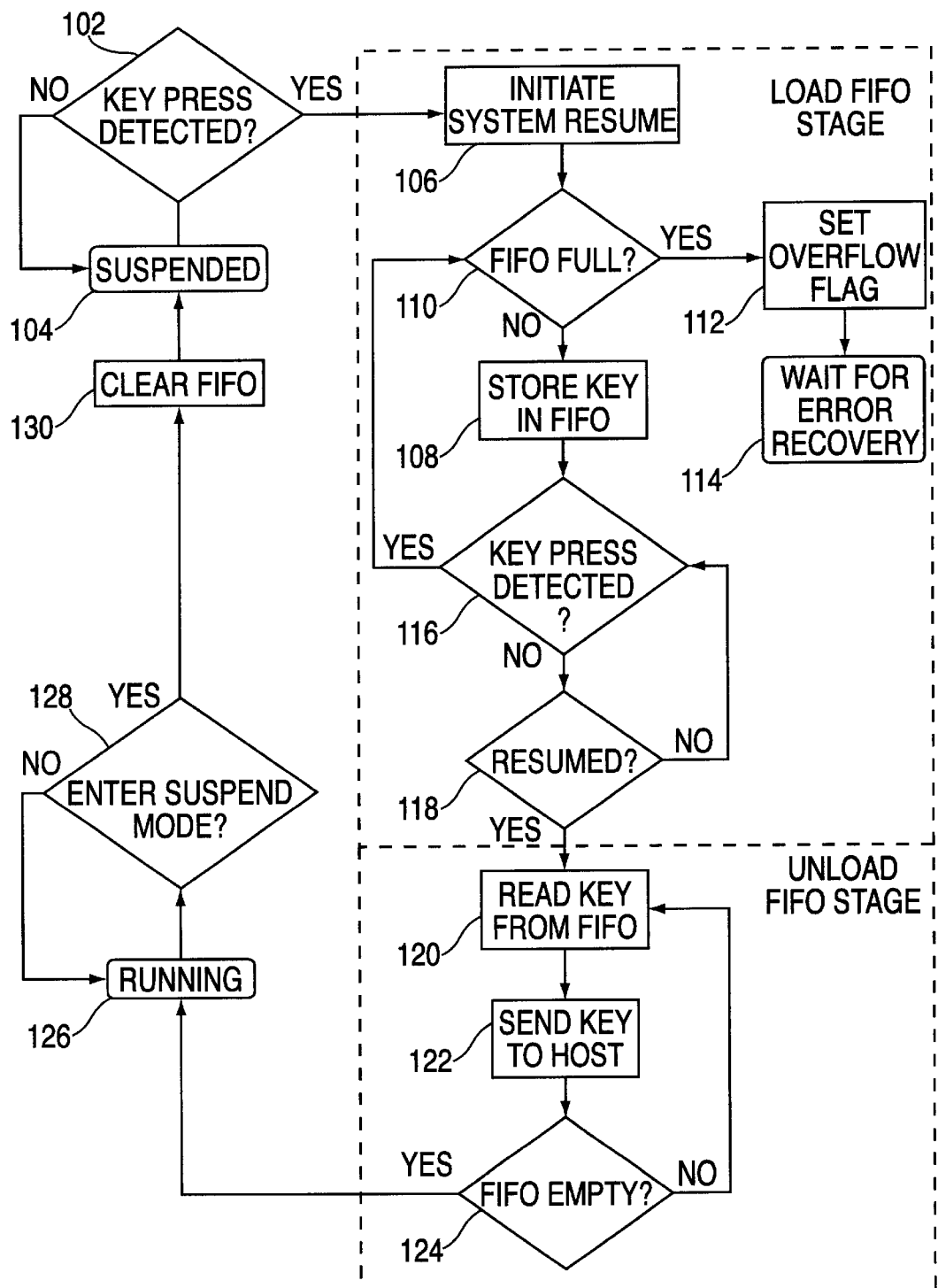
FIG. 1 provides a flowchart illustrative of the transition between the peripheral suspend mode and the peripheral active mode under an embodiment of the present invention.

FIG. 1 provides a flowchart illustrative of the transition between the peripheral suspend mode and the peripheral active mode under an embodiment of the present invention. In one embodiment, while in the 'suspend' mode, the system evaluates whether or not a keystroke or other input has been received by the peripheral device 102. If not, the system remains in the suspend mode 104. If a keystroke is recognized, the system initiates a system resume 106, beginning the transition period. During this transition from the suspend mode to the active mode, the system utilizes a peripheral memory device within the peripheral device to store inputted data (keystrokes, etc.) in a queue 108. This queue is established to receive and deliver data with a First In, First Out (FIFO) priority scheme.

In an embodiment of the present invention, the queue (FIFO) has a finite capacity for data —its maximum queue depth. Because of the limited capacity, before attempting to store the keystroke in the FIFO 108, the system checks 110 to see if the FIFO is full (the queue depth has reached the maximum queue depth). If the FIFO is full, an overflow flag is set 112. The overflow flag may trigger the utilization of an error correction algorithm 114 to compensate for missing input data (keystrokes, etc.) as well as other possible events. In one embodiment, the capacity of the peripheral memory device would be such that the maximum queue depth would be substantially greater than the amount of inputted data a peripheral device would receive in the amount of time necessary for transition to the active state.

In an embodiment of the present invention, after storing each keystroke 108, a subsequent keystroke is looked for 116 (to be stored) until the system has returned to the active state (resumed) 118. Once the system has returned to the active state, the bottom data string (keystroke) of the queue is read 120 and transferred from the peripheral memory device to the host computer 122. It repeats the process of transferring keystrokes to the host computer with a FIFO priority until it determines 124 that the queue is empty.

In an embodiment, while in the active state 126, the system determines whether some pre-determined criteria has been met to allow the system to return to the suspend mode 128. In one embodiment, the criteria would be the passing of some specified amount of time without peripheral input. For example, the system could be configured so that if the operator has not entered any keystrokes for more than 4 seconds, the system would go into the suspend mode. If it is determined that the system should return to the suspend mode, the queue is cleared 130, and the system is suspended 104 to place the peripheral device back in a state of low-power operation.

Figure 2:
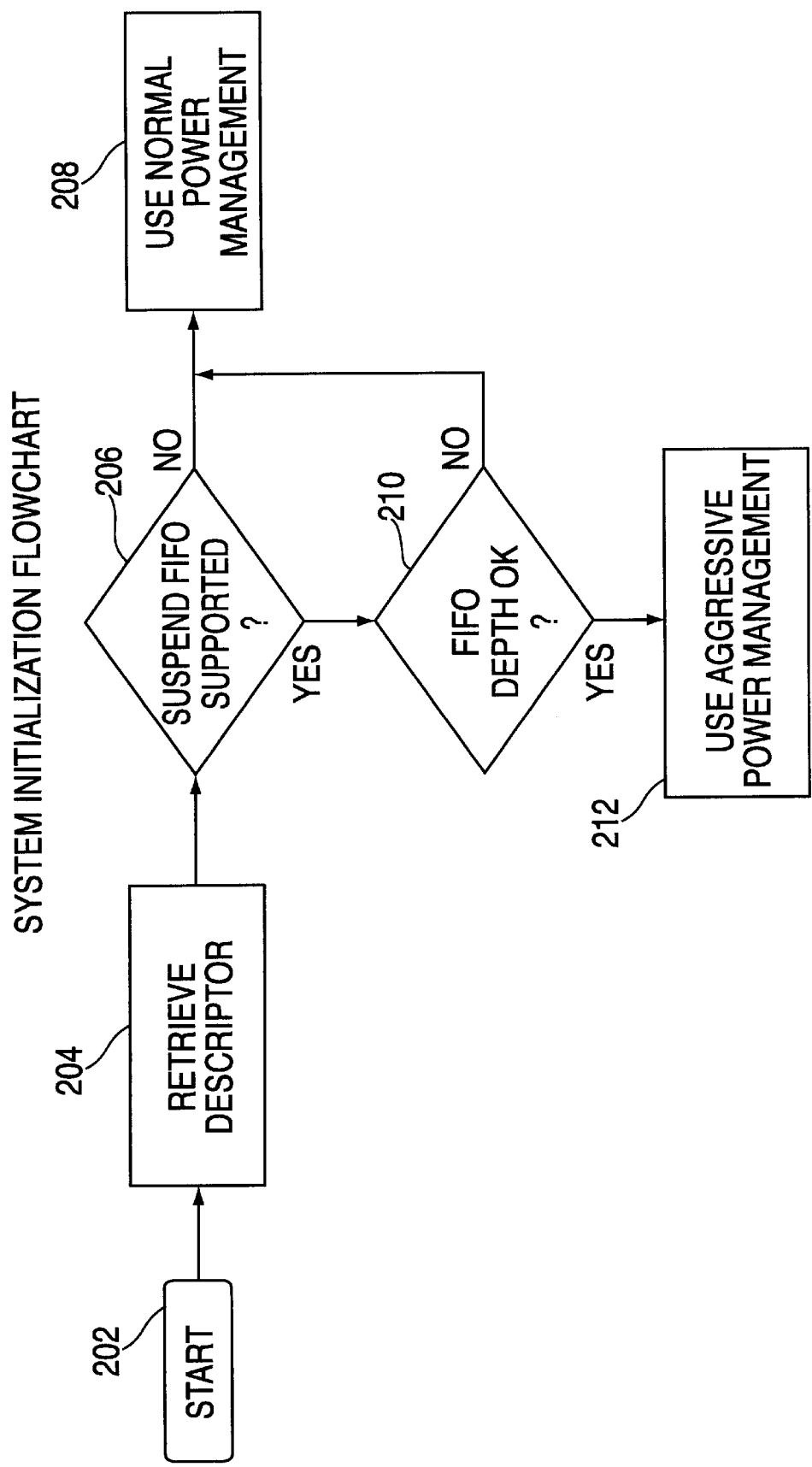
FIG. 2 provides a flowchart illustrative of the process of system initialization under the Universal Serial Bus protocol known as the Human Interface Device protocol.

FIG. 2 provides a flowchart illustrative of the process of system initialization under the Universal Serial Bus (USB) protocol (USB Rev. 1.1; USB Implementors Forum, Inc.) known as the Human Interface Device (HID) protocol (HID Version 1.1; USB Standards Group). In one embodiment, upon initialization of the system, it is necessary to determine whether the peripheral device is capable of supporting the process of being placed in a 'suspend' mode and storing inputted data during the transition back to the active mode (termed 'aggressive' power management herein). Because some peripheral devices may not be able to store input data, this feature may not be supported. At the beginning of system initialization 202, the system retrieves the data structure (descriptor) 204, which identifies the device's features, from the peripheral device. In one embodiment, if the peripheral device does not support this suspend mode 206, no peripheral device suspend functionality is instituted, and a power management scheme is utilized that lacks the peripheral device suspend mode (termed 'normal' power management herein) 208.

In an embodiment, the system next checks the peripheral device's descriptor to determine the maximum depth of the FIFO queue. If the queue's capacity is great enough 210 to support reasonable operation (e.g., exceeds a threshold value) of the peripheral device while utilizing aggressive power management, the peripheral device suspend mode will be utilized (aggressive power management) 212. If the capacity is not great enough 210, normal power management is utilized 208. In other words, if the maximum number of keystrokes storable by the FIFO queue is less than is likely to be inputted during the time period it takes for the system to transition from the suspend mode to the active mode, an overflow condition would be likely. Therefore, if this is the case, aggressive power management should not be used. Normal power management should be used instead.

Figure 3:
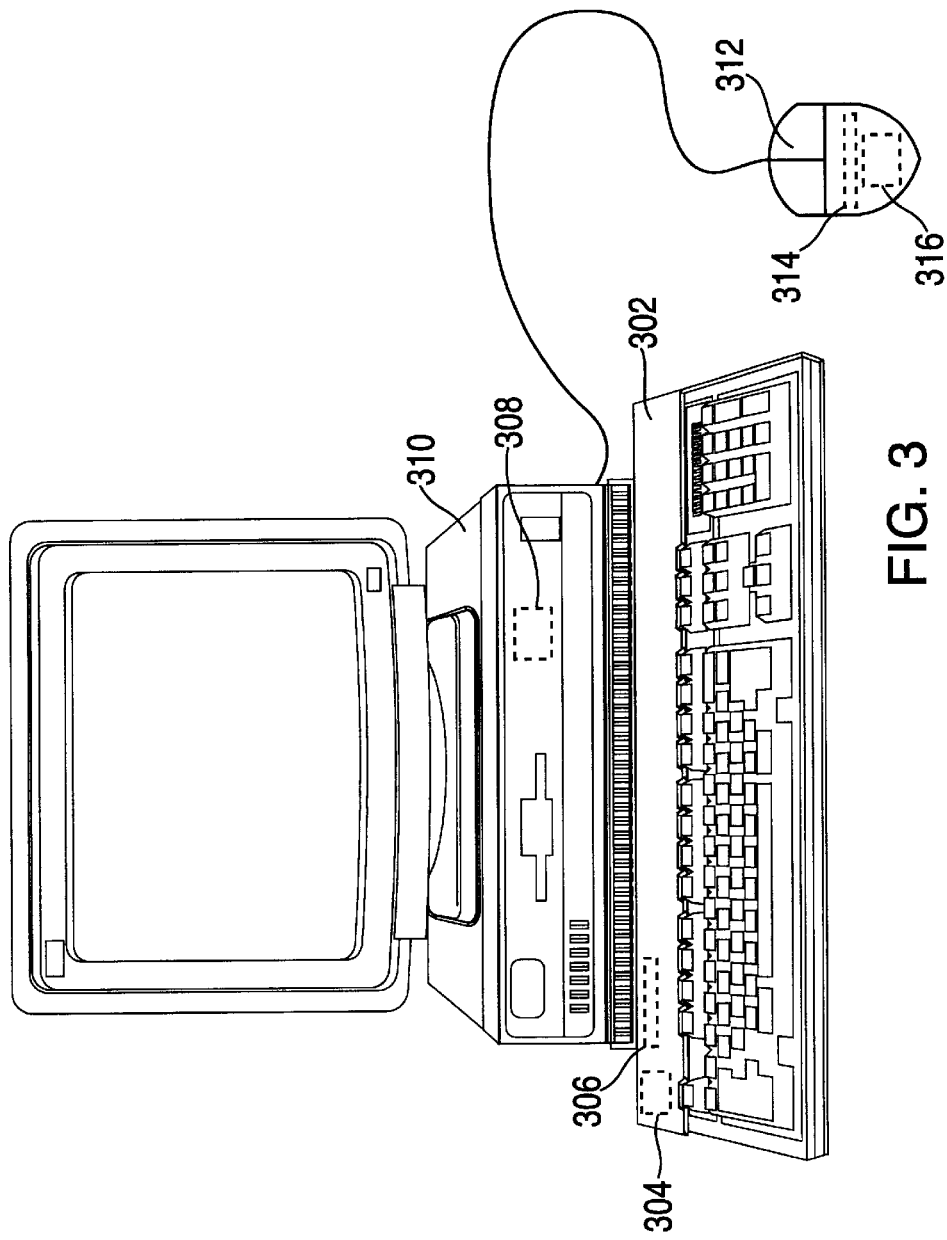
FIG. 3 illustrates a possible layout of components in one embodiment of the present invention.

FIG. 3 illustrates a possible layout of components in one embodiment of the present invention. In one embodiment, a keyboard 302 supportive of aggressive power management contains a keyboard controller device 306 to trigger the transition from the suspend mode to the active mode when a key engagement has been sensed. Further, a keyboard memory device 304 exists in an embodiment to store keystrokes entered during the transition of the peripheral device components to the active state.

In an alternate embodiment, a mouse 312 is supportive of aggressive power management. The mouse 312 contains a mouse controller device 314 to trigger the transition from the suspend mode to the active mode when button engagement or mouse movement has been sensed. Further, a mouse memory device 316 exists in an embodiment to store button activity and mouse movement sensed during the transition of the peripheral device components to the active state. In other possible embodiments, the peripheral device can be any other device, wired or wireless, capable of supplying input to the system.

In one embodiment, the host computer 310 contains a peripheral controller 308 to re-establish communication between the peripheral device 302,312 and the host computer 310 after the system has resumed to the active state. The peripheral controller 308, which can be in the form of hardware or software, also causes the change from the active state to the suspend state upon the existence of the appropriate condition, such as passage of some pre-determined amount of time with no peripheral device 302, 312 activity.

Although several embodiments are specifically illustrated and described herein, it will be appreciated that modifications and variations of the present invention are covered by the above teachings and within the purview of the appended claims without departing from the spirit and intended scope of the invention.

What is claimed is:

1. A system for minimizing power consumption for a peripheral device, comprising:
    a peripheral device;
    a peripheral memory device associated with the peripheral device, wherein
        when said peripheral device is in a suspend mode, receipt of input data by the peripheral device causes a transition period to begin, during which the peripheral device changes from the suspend mode to an active mode; and
        wherein during the transition period, the input data is stored in the peripheral memory device.

2. The system of claim 1, wherein when the peripheral device enters the active mode, the input data is transferred from the peripheral memory device to a host computer.

3. The system of claim 2, wherein the peripheral memory device stores the input data in a queue of a queue depth and transfers the input data with a 'First In, First Out' priority.

4. The system of claim 3, wherein the queue has a maximum queue depth and the input data is a data stream of a data stream length, and wherein an overflow flag is set when the data stream length is greater than the maximum queue depth.

5. The system of claim 4, wherein the queue depth is continuously monitored to provide the overflow flag if and when the queue depth exceeds the maximum queue depth.

6. The system of claim 4, wherein an error correction process is enacted in response to the overflow flag.

7. The system of claim 2, wherein the suspend mode is a state of low peripheral processor activity and minimal communication between the peripheral device and the host computer, and the active mode is a state of normal peripheral processor activity.

8. The system of claim 2, wherein the queue is cleared after the input data is transferred from the peripheral memory device to the host computer.

9. The system of claim 1, wherein the peripheral device is a keyboard.

10. The system of claim 1, wherein the peripheral device is a mouse.

11. The system of claim 1, wherein the peripheral device changes from the active mode to the suspend mode when a predetermined amount of time without peripheral input has passed and an initialization condition has been satisfied.

12. The system of claim 11, wherein the initialization condition has been satisfied if, upon a system initialization, it was determined that the maximum queue depth of the peripheral memory device is at least as great as a predetermined amount.

13. A method for minimizing power consumption for a peripheral device, comprising:

causing, by receipt of input data by the peripheral device, while the peripheral device is in a suspend mode a transition period to begin during which the peripheral device changes from the suspend mode to an active mode; and storing, during the transition period, in a peripheral memory device associated to the peripheral device the input data.

14. The method of claim 13, wherein when the peripheral device enters the active mode, the input data is transferred from the peripheral memory device to a host computer.

15. The method of claim 14, wherein the peripheral memory device stores the input data in a queue of a queue depth and transfers the input data with a 'First In, First Out' priority.

16. The method of claim 15, wherein the queue has a maximum queue depth and the input data is a data stream of a data stream length, and wherein an overflow flag is set when the data stream length is greater than the maximum queue depth.

17. The method of claim 16, wherein the queue depth is continuously monitored to provide the overflow flag if and when the queue depth exceeds the maximum queue depth.

18. The method of claim 16, wherein an error correction process is enacted in response to the overflow flag.

19. The method of claim 13, wherein the suspend mode is a state of low peripheral processor activity and minimal communication between the peripheral device and the host computer, and the active mode is a state of normal peripheral processor activity.

20. The method of claim 14, wherein the queue is cleared after the input data is transferred from the peripheral memory device to the host computer.

21. The method of claim 13, wherein the peripheral device is a keyboard.

22. The method of claim 13, wherein the peripheral device is a mouse.

23. The method of claim 13, wherein the peripheral device changes from the active mode to the suspend mode when a predetermined amount of time without peripheral input has passed and an initialization condition has been satisfied.

24. The method of claim 23, wherein the initialization condition has been satisfied if, upon a system initialization, it was determined that the maximum queue depth of the peripheral memory device is at least as great as a predetermined amount.

25. A set of instructions residing in a computer readable storage medium, said set of instructions capable of being executed by a processor for minimizing power consumption for a peripheral device, comprising:

causing, by receipt of input data by the peripheral device, while the peripheral device is in a suspend mode a transition period to begin during which the peripheral device changes from the suspend mode to an active mode;

storing, during the transition period, in a peripheral memory device associated to the peripheral device the input data in a queue of a queue depth with a 'First In, First Out' priority;

transferring, with a 'First In, First Out' priority, the input data from the peripheral memory device to a host computer when the peripheral device enters the active mode;

monitoring continuously the queue depth to provide an overflow flag if and when the queue depth exceeds a maximum queue depth.

26. The set of instructions of claim 25, wherein an error correction process is enacted in response to the overflow flag.

27. The set of instructions of claim 25, wherein the suspend mode is a state of low peripheral processor activity and minimal communication between the peripheral device and the host computer, and the active mode is a state of normal peripheral processor activity.

28. The set of instructions of claim 25, wherein the queue is cleared after the input data is transferred from the peripheral memory device to the host computer.

* * * * *